Nov. 5, 1929.  R. M. MITCHELL  1,734,391
CORN PICKER
Filed March 3, 1927   10 Sheets-Sheet 1

Inventor.
Robert M. Mitchell.
By

Nov. 5, 1929.  R. M. MITCHELL  1,734,391
CORN PICKER
Filed March 3, 1927   10 Sheets-Sheet 4

Inventor.
Robert M Mitchell.
By H. P. Doolittle
Atty.

Nov. 5, 1929.  R. M. MITCHELL  1,734,391
CORN PICKER
Filed March 3, 1927   10 Sheets-Sheet 5

Inventor.
Robert M. Mitchell.
By [signature]
Atty.

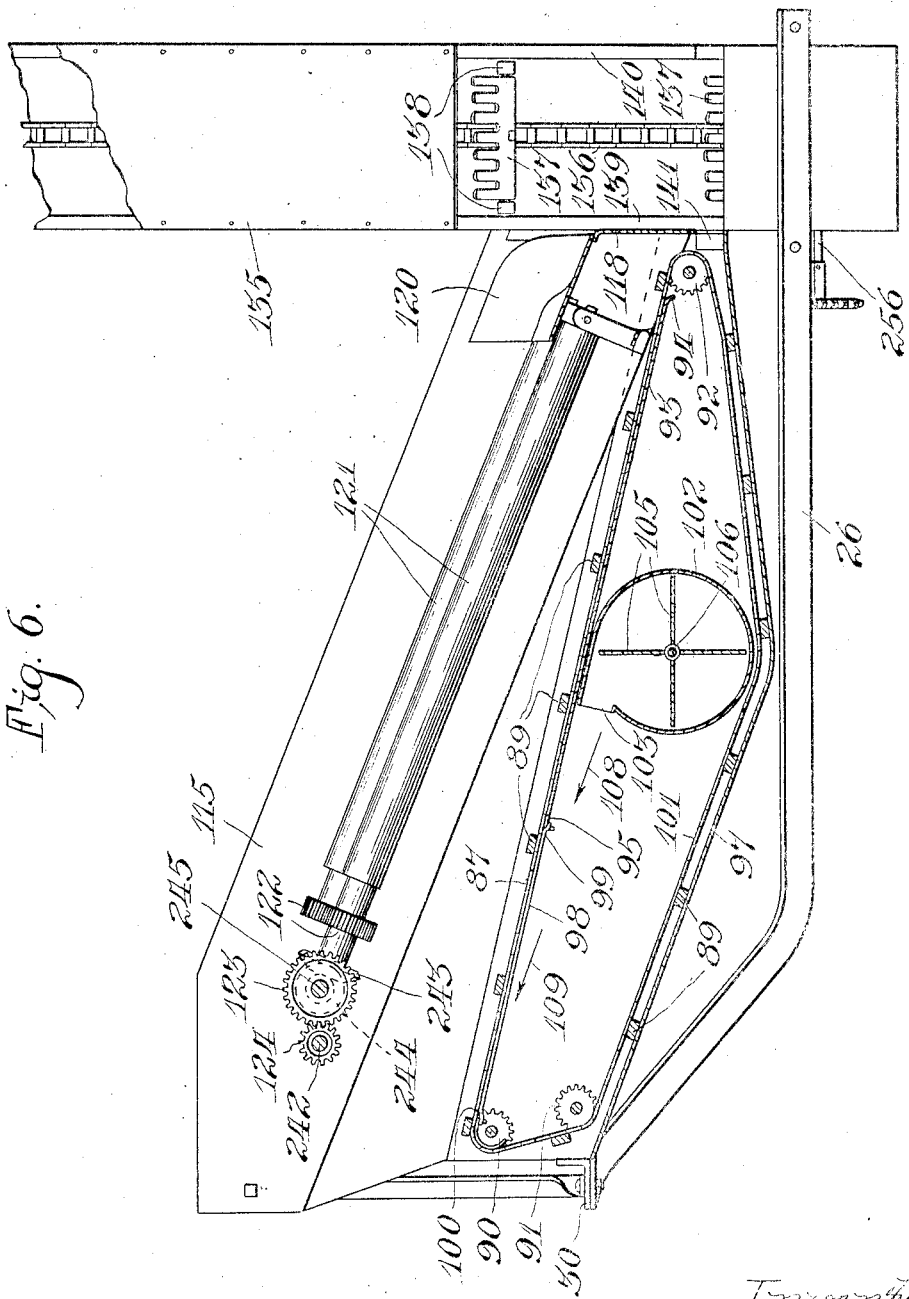

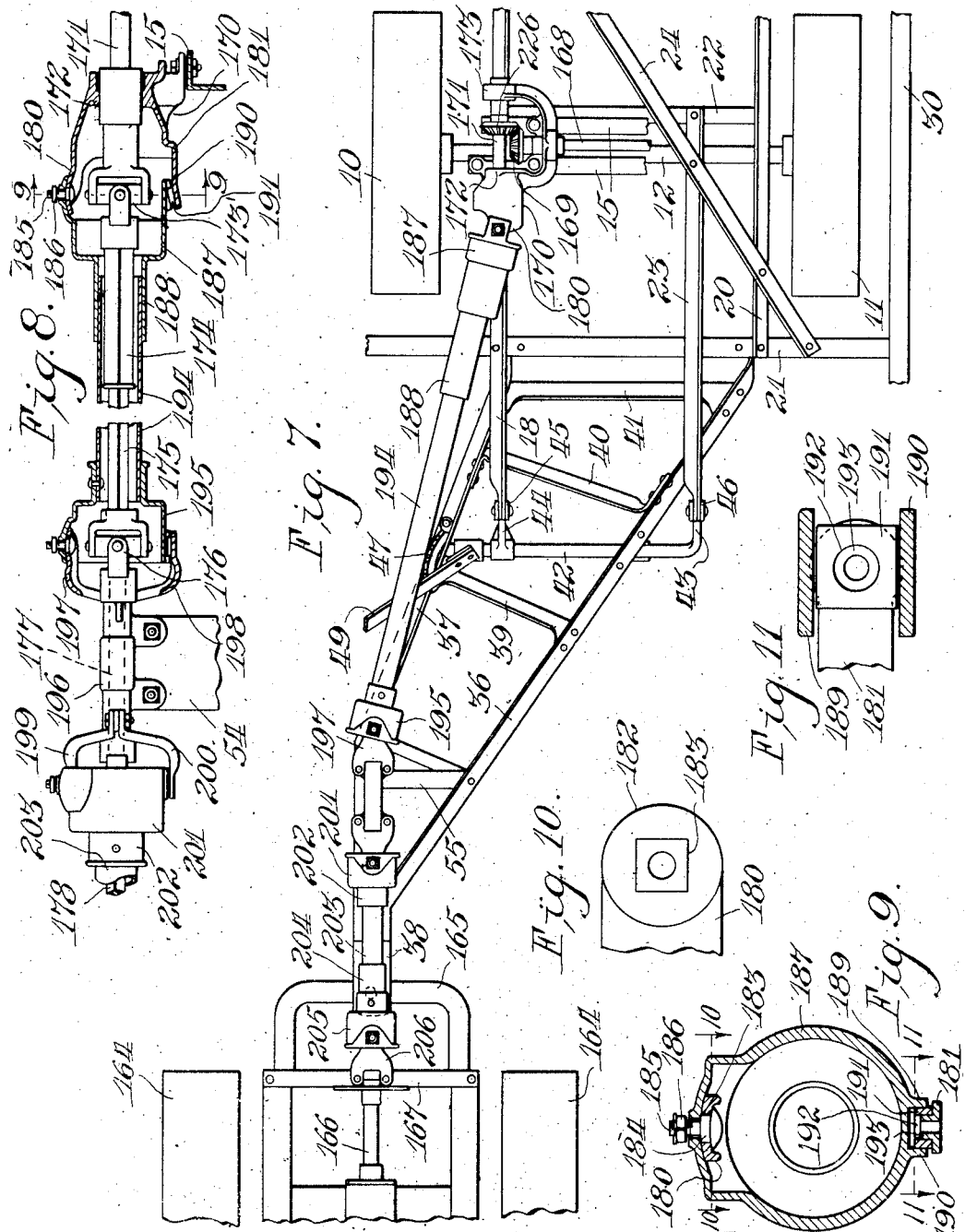

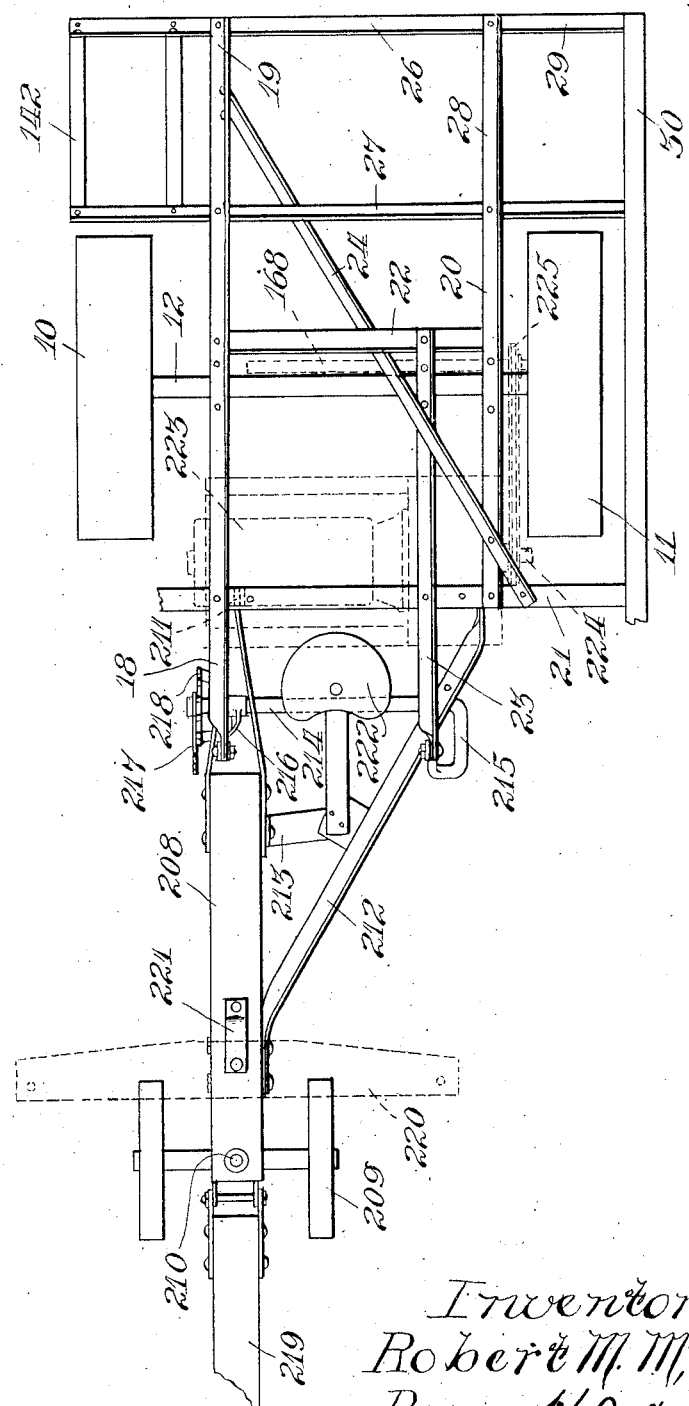

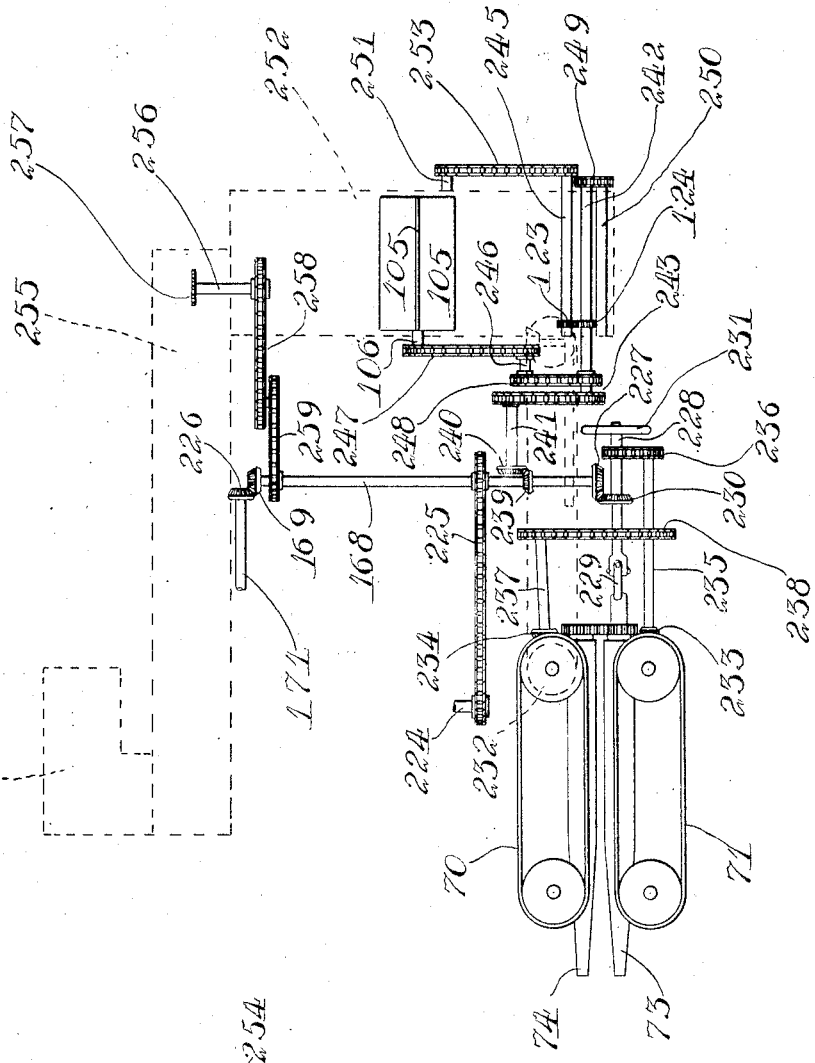

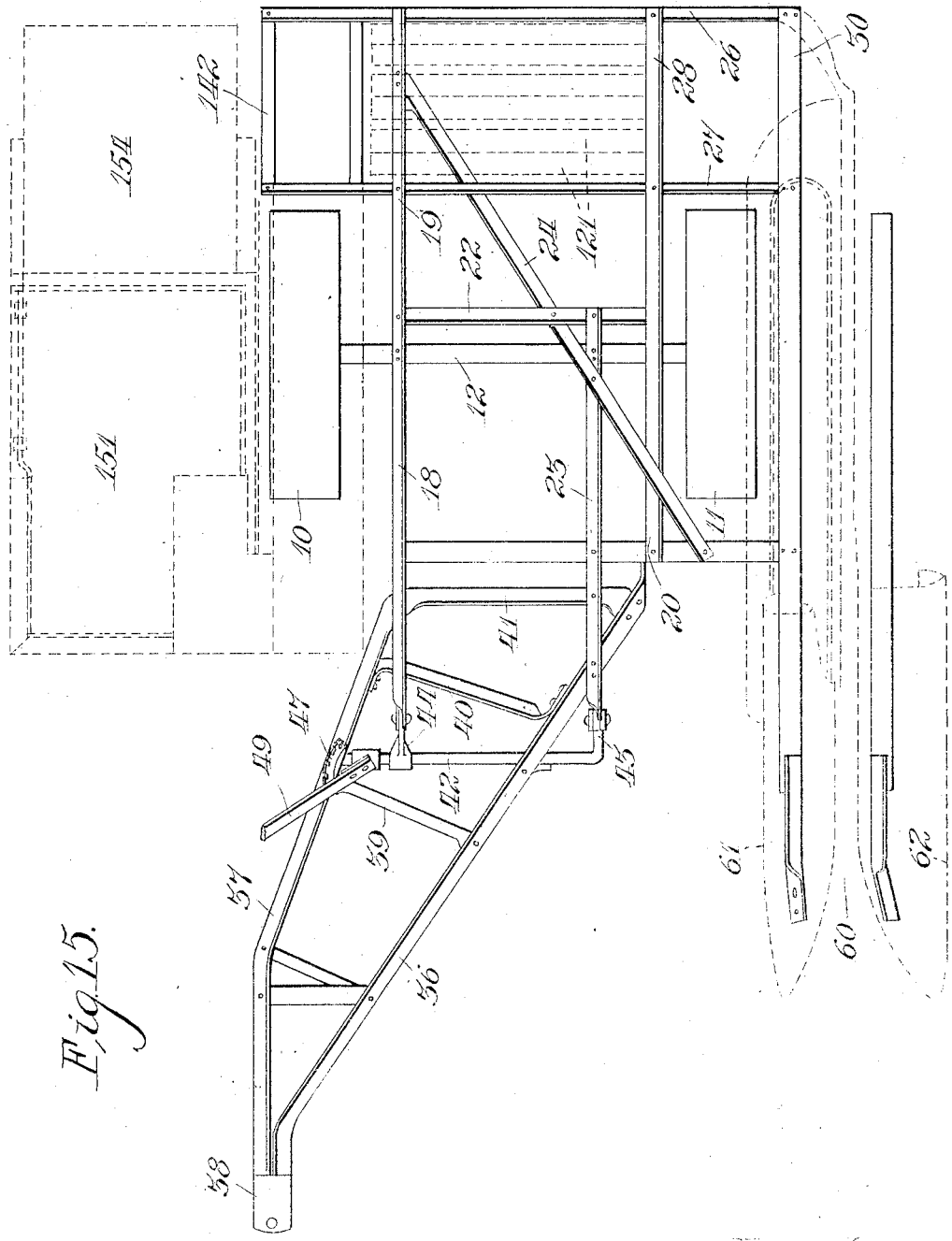

Patented Nov. 5, 1929

1,734,391

UNITED STATES PATENT OFFICE

ROBERT M. MITCHELL, OF CHICAGO, ILLINOIS, ASSIGNOR TO INTERNATIONAL HARVESTER COMPANY, A CORPORATION OF NEW JERSEY

CORN PICKER

Application filed March 3, 1927. Serial No. 172,308.

This invention relates to harvesting machines, and more particularly to improvements in a corn harvester.

The harvester herein disclosed is a machine mounted for travel in a field of standing corn. As the machine passes through the field, it snaps the ears of corn from the stalks, transfers the ears to husking mechanism, removes the husks from the ears of corn and transfers the corn to bagging apparatus, there being groups of bags of corn deposited at intervals in the field after the machine has been used.

It is an object of the invention to provide a practical and successful corn harvester of such novel construction that it is advantageously adapted for tractor operation.

A further object of the invention is to provide a corn picker having a draft apparatus and power transmitting connections associated in a novel manner so as to provide for the advantageous operation of the parts of the corn picker by power driven shafts upon the tractor.

It is a further object of the invention to provide a composite corn harvester, the component parts of which may be manufactured as complete and self-contained units for facilitating assembly of those parts around a substantially central frame construction.

Another object of the invention is to provide a tractor operated corn picker having its various component parts substantially balanced against each other across the supporting frame for promoting successful operation and eliminating unnecessarily destructive wear upon the machine.

Other objects of the invention will appear as the description of the invention proceeds.

An illustrative embodiment of the invention is shown in the accompanying drawings in which similar reference characters indicate like parts.

In the drawings:

Figure 6 is a vertical sectional view thru the husking roll mechanism and the separating mechanism;

Figure 7 is a plan of the tractor drive connections for operating one form of the illustrative machine;

Figure 8 is a detail view of part of the tractor drive connections;

Figure 9 is a detail view in vertical section taken on the section line 9—9 of Figure 8;

Figure 10 is a plan of a part of the shield connections taken on the section line 10—10 of Figure 9;

Figure 11 is a detail view taken on the section line 11—11 of Figure 9;

Figure 12 is a plan of a modification of the illustrative machine in which the operative parts are driven by a unitary power plant mounted upon the main frame;

Figure 13 is a diagrammatic view showing all of the driving connections for operating all of the parts from a common central shaft;

Figure 14 is a diagrammatic view showing part of the gearing for operating the husking rolls; and Figure 15 is a plan view of the illustrative machine showing the general arrangement of all of the operative parts about a central main frame, and the relation of the draft frame to the main frame and the operative parts.

In the shipment of the machines of the character disclosed herein it is advantageous from many standpoints to prepare a number of packages containing its component parts. In the illustrative machine the parts are so arranged that relatively complete units may be assembled and shipped in compact packages ready, upon reaching their destination, to be placed in proper operative relations with a minimum of difficulty.

Figure 1:
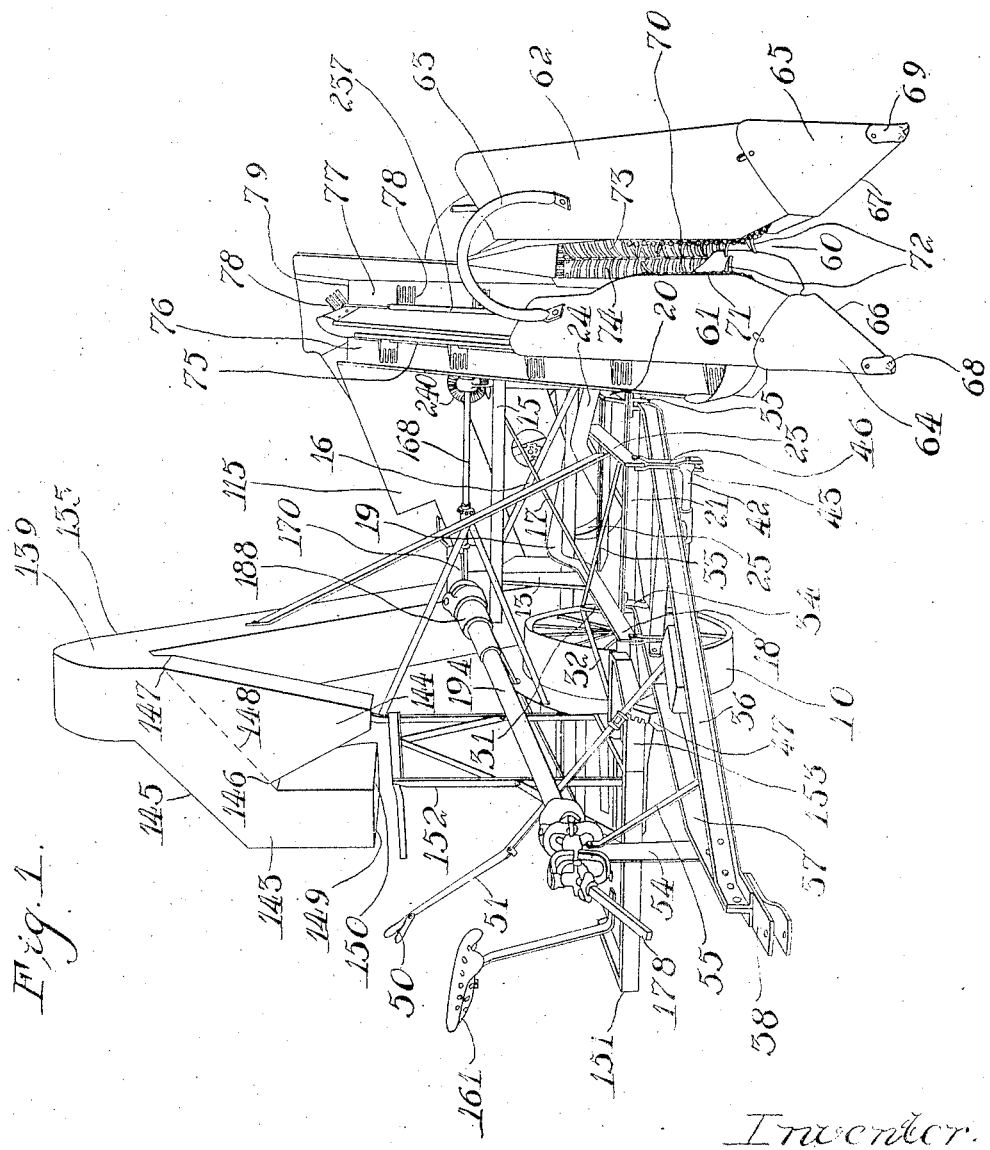
Figure 1 is a front perspective view of the assembled machine.

The machine will be herein treated as comprising a number of such units. Beginning at the left of Figure 1 of the drawings, there is disclosed a unit comprising gathering boards, elevating chains, snapping rolls, and an elevator for receiving material from the snapping rolls and conveying it to a husking mechanism. At the rear of the frame construction shown in Figure 1 is a husking roll mechanism receiving ears of corn from the conveyor of the first mentioned unit. This husking roll mechanism is preferably constructed as a self-contained unit and is in a superposed position relative to a third unit which comprises mechanisms for receiving husks and kernels of corn from the husking roll mechanism. This third unit separates the husks from the kernels of corn.

A fourth unit shown at the left and rear of the construction illustrated in Figure 1, comprises an elevator combined with ear and kernel separating mechanism and chutes for separately delivering the ears and kernels. A fifth unit shown in Figure 1 comprises bagging apparatus including a bagging platform located substantially beneath the delivery end of the chutes of the fourth unit. Incorporated in the fifth unit is a bag dumping apparatus.

All of the above mentioned units are preferably separately manufactured and are separately and successively assembled around a main frame which may be considered as a sixth unit. Extending forwardly of the main frame is a pivoted draft frame herein described as a seventh unit. All of the above mentioned units will hereinafter be described in detail.

The main frame

As illustrated in the drawings the main frame is carried by ground or supporting wheels 10 and 11. These wheels are connected by an axle 12 from which uprights 13 and 14 extend. These uprights are preferably mounted on the axle between the supporting wheels for promoting compactness of frame construction. The uprights 13 and 14 are connected at their tops by a horizontal beam construction 15 preferably extending outwardly of the uprights and overlying one of the ground wheels at its snapping roll end. This much of the frame construction forms a substantially rectangular arrangement of elements which are shown as being rigidified by diagonal braces 16 and 17.

Preferably secured to the upright 13 somewhat above the axle 12 is a fore and aft beam 18, the rear end of which is elevated as indicated at 19. Secured to the other upright 14 is a longitudinally extending beam 20. The forward end of beams 18 and 20 are rigidly secured to a front transverse beam 21, a rectangular frame-work being completed by a rear transverse beam 22 secured to the beam 18 and 20 rearwardly of the axle 12.

Figure 2:
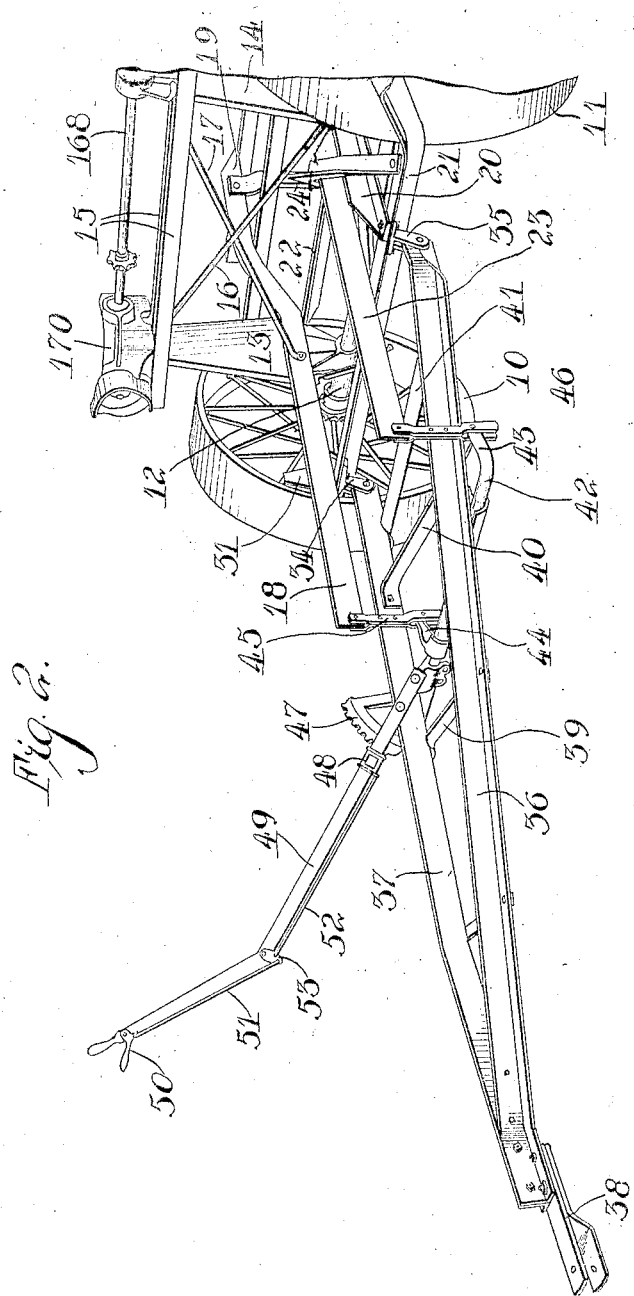
Figure 2 is a perspective view of the frame construction of the illustrative machine showing particularly the construction of the main wheel supported frame and the relation of the draft frame thereto.

As illustrated, particularly in Figure 2 of the drawings, the transverse beams 21 and 22 are connected inwardly of the beam 20 by a second fore and aft beam 23 preferably resting near its mid-portion on the top of the beam 21 and secured at its rearward end to the beam 22. From a position on the transverse beam 21 and to the right of the connection of that beam with beam 20 (see Figure 2), a balancing beam 24 extends upwardly over the tops of the beams 20 and 23 diagonally of the main frame and toward the rear end of the beam 18. This balancing beam 24 is secured at its front end to the beam 21 and near its rearward end is preferably bent downwardly and again upwardly as it approaches the elevated end of the beam 18.

Figure 4:
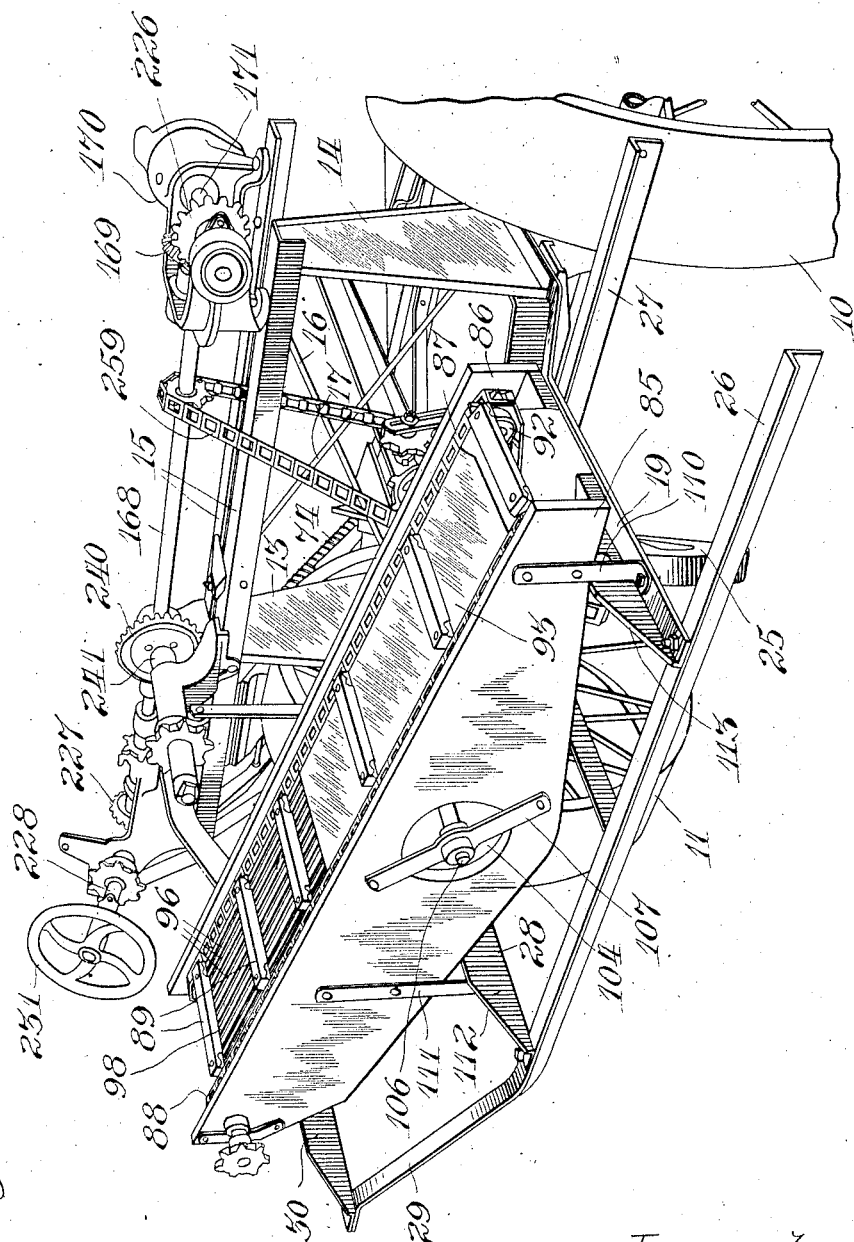
Figure 4 is a perspective view taken from the rear of the illustrative machine and showing the machine at one stage in its assembly, the unitary cleaning mechanism for separating husks and kernels of corn being shown in the foreground of this view.

Inasmuch as a goodly portion of the weight of the snapping roll mechanism is carried by the main frame at a position adjacent the union of the beams 21 and 24, and inasmuch as goodly portions of the weights of the elevator and the husking roll mechanism are carried by the frame construction adjacent the rearward end of the beam 24, this beam acts somewhat as a lever of the first class in balancing portions of the above mentioned mechanisms across an intermediate support provided for the beams 20 and 23. Figure 4 of the drawings illustrates the relation of the rearward end of the balancing beam 24 to the unit of the machine which contains the mechanism for separating the husks from the kernels, the downwardly bent rear end of the beam 24 being indicated at 25 in this figure.

As also illustrated in Figure 4 of the drawings the rearward and elevated extension of the beam 18 has secured thereto two transversely extending platform beams 26 and 27. These beams are substantially parallel and are connected near their other ends to the rearward extension 28 of the beam 20. In Figure 4 of the drawings the left hand ends of the beams 26 and 27 are shown as bent upwardly at 29 toward a beam 20 to which they are secured. The beam 30 is preferably fixed at its forward end to the beam construction 15 previously described.

As shown in Figures 1 and 2 of the drawings, the main frame is provided with a truss construction for maintaining the bagging platform in proper position. This construction preferably comprises a compression member 31 located near one end of the transverse beam 21 and upstanding therefrom alongside the fore and aft beam 18. Extending over this compression member and downwardly from the top thereof on each side are tension members 32 and 33, herein shown as comprising a single rod secured at one end to the beam 21 and at its other end, to an extension of that beam.

The right hand ends of the beams 26 and 27, as shown in Figure 4 of the drawings, extend beyond the end of the husk and kernel separating unit for the purpose of insuring the accurate positioning of the elevator relative to the outlet of the husk and kernel separating mechanism. Pivot brackets 34 and 35 are secured to the forward side of the transverse beam 21.

The draft frame

In the illustrative machine the position of application of the draft to the machine, or, in other words, the point at which the tractor is attached to the machine, is substantially directly forward of the left hand ground wheel (see Figure 2). Preferably a rigid draft frame extends from this point to the pivot brackets 34 and 35. This frame consists of side bars 36 and 37, both of these bars having their ends offset to provide for relative location of the draft, as above mentioned. The side bars 36 are preferably joined at their forward ends and are there secured to a hitch device 38. From this point the bars diverge rearwardly to the pivot brackets 34 and 35.

For advantageously rigidifying the draft frame, suitable cross bars 39, 40 and 41 extend between the side bars and are rigidly secured thereto. Also extending between the side bars 36 and 37 and rotatively mounted beneath them is a rock shaft 42 provided with crank arms 43 and 44. These crank arms are pivotally connected by means of links 45 and 46 to the forward ends of the beams 18 and 23. Secured to one of the side bars is a detent bracket 47 for cooperation with a detent 48 mounted upon the hand lever 49. This hand lever is rigidly secured to the rock shaft 42 and extends to such a position that it affords the operator of the machine convenient access to means for adjusting the frame and thereby raising or lowering the snapping roll mechanism with reference to the ground. A thumb latch 50 cooperating with links 51 and 52 and the pivot element 53, enables the operator to release or engage the detent 48 with the bracket 47.

An upright 54 is shown secured to the bar 37 for supporting parts of the power transmitting connections to be hereinafter described. This upright is suitably strengthened by an inclined brace 55 preferably rigidly secured to the upright at its upper end and secured to the side bar 36 at its lower end.

The snapping roll mechanism

The device herein designated as a snapping roll mechanism is a unitary structure including means for lifting corn stalks, means for guiding the corn stalks to a snapping roll passage-way, means for positively moving the stalks along that passage-way, means for snapping the ears of corn from the stalks, and means for transferring or elevating the ears of corn to an elevated position from which they are delivered to a husking mechanism.

In Figure 1 of the drawings the unitary structure above specified is located at the right hand side of the main frame and positioned so as to extend forwardly of the main frame at the right hand forward corner thereof. A snapping roll passage-way 60 is formed by spaced stalk gatherer guides 61 and 62, which are held in suitably spaced positions by an upstanding bridge element 63.

At the lower ends of the guides 61 and 62 are forwardly pointed stalk lifting members 64 and 65, the inner surfaces of these members sloping inwardly and upwardly, as indicated at 66 and 67. There is thus formed a stalk gathering throat having rearwardly diverging sides. The points 68 and 69 of the members 64 and 65 are adapted to ride along the ground closely adjacent the surface thereof so as to move under any corn stalks which are bent or fallen.

Beneath the guides 61 and 62 are stalk gathering chains 70 and 71 preferably formed with inwardly extending fingers 72 for pushing the stalks of corn up the snapping roll passage-way. As the stalks are moved up this passage-way they are acted upon by snapping rolls 73 and 74. These rolls are preferably rotated in opposite directions so that their adjacent surfaces are moving downwardly to snap the ears of corn from the stalks. The arrangement of the stalk gathering chains and the devices for operating the snapping rolls are similar to those shown in the United States patent to Hagadone 1,303,298, granted May 13, 1919. The details of those devices will, therefore, not be particularly shown or described in this application.

Mounted alongside the snapping rolls is a conveyor 75 operating in the troughs 76 and 77. This conveyor is provided with outwardly projected elements 78 which engage the ears of corn as they leave the upper ends of the snapping rolls. The ears of corn move upwardly from the trough 77 to an elevated position indicated at 79. From this position they are delivered to a mechanism which removes the husks.

The husk and kernel separating mechanism

As illustrated in Figures 4 and 6 of the drawings the husk and kernel separating mechanism formed as a separate and complete unit is mounted transversely of the frame and at the rear thereof. This unit is separately manufactured, may be separately packed and shipped as a complete unit, and taken from its package and mounted on the frame with minimum difficulty and with little change in its equipment. As shown, this separating mechanism is a box-like structure having open ends. Between the sides 85 and 86 is mounted an inclined conveyor comprising the chains 87 and 88 and the connecting conveyor slats 89. The conveyor chains are trained around sprockets 90, 91 and 92.

The upper run of the conveyor is for a considerable distance from its lower end supported by a husk platform or shield 93 extending from the position indicated at 94 to the position indicated at 95. The corn husks falling from the husking mechanism are intercepted by the platform 93 and are carried upwardly thereover by the conveyor slats 89. Beyond the upper end of the platform 93 the husks are supported by a grating 96 which permits kernels of corn to fall thru to the bottom 97 of the separating mechanism. This grating preferably comprises longitudinal bars 98 secured substantially in alignment with the platform 93 and supported at their ends as indicated at 99 and 100.

The lower run 101 of the conveyor moves downwardly so that the slats 89 scrape along the bottom wall 97 for a considerable portion of the length of the mechanism. In doing so the slats move the kernels underneath the blower housing 102 and toward the outlet of the separating mechanism shown at the right hand side of Figure 4. The upper and lower runs of the conveyor are sufficiently separated at their mid-portions to permit of the mounting of the blower housing between them. This housing is secured to the sides 85 and 86. It is substantially cylindrical in form with open ends and with a substantially tangential outlet 103. The open ends of the housing communicate with the atmosphere thru openings such as that shown at 104 in Figure 4.

Within the blower housing a fan having radial blades 105 is mounted. This fan is secured to a shaft 106 rotatively mounted in the supports 107 secured to the sides of the mechanism as indicated in Figure 4 of the drawings. A blower directs a blast of air thru the upper end of the box-like structure and thru the grating 98 for ejecting the corn husks from the machine. This blast of air is directed substantially as indicated by the arrows 108 and 109. Beyond and to the right of the blower housing 103 the conveyor slats move to force all kernels of corn out of the mechanism at the outlet illustrated in Figure 4.

The separating mechanism, as illustrated in Figure 4 of the drawings, is mounted substantially inwardly of the projected ends of the frame members 26 and 27. These members advantageously operate to insure the correct alignment and positioning of the separating mechanism relative to a material handling mechanism or conveyor to be later described. Uprights 110 are secured to the walls 85 and 86 near their lower ends, and similar uprights 111 are secured to the walls near the upper end of the separating mechanism. These uprights are advantageously left secured to the separating mechanism during shipment and in assembly co-operate with vertical flanges 112 and 113 of the frame members 19 and 28 to effectively hold the separating mechanism in place with a minimum of securing means. In effect, the uprights on one side of the separating mechanism straddle the flanges 112 and 113. The uprights 110 are secured to the bar 19 on the right hand side of the flange 113 (see Figure 4) and the uprights 111 are secured to the bar 28 on the left hand side of its flange 112 thus affording an advantageous arrangement of elements for effectively maintaining the separating-mechanism correctly in operating position during the use of the machine.

The husking roller mechanism

Figure 5:
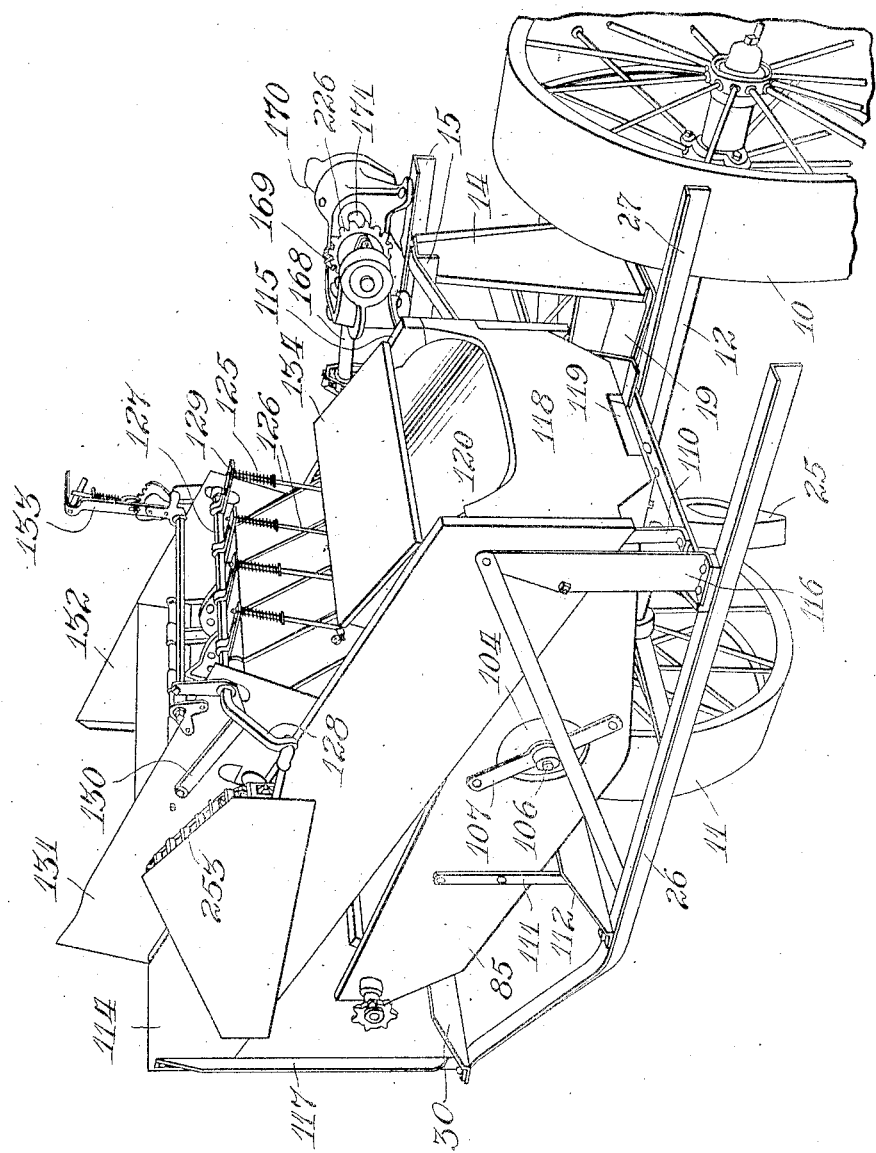
Figure 5 is a perspective view illustrating the novel manner of mounting the husking roll unit on the machine.

As shown in Figure 5 of the drawings a husking roll mechanism is mounted upon the rear portion of the frame above the husk and kernel separating mechanism. This husking mechanism comprises a box-like structure having side walls 114 and 115 supported at their ends by standards 116 and 117. The side walls are connected at the lower end of the structure by an end wall 118 having a cut out portion 119 at the bottom to provide for a continuation of the outlet of the husk and kernel separating mechanism previously described. The upper end of the wall 118 is formed, as shown in Figure 5 of the drawings, to constitute the continuation of a chute 120.

Between the sloping side walls of the husking roll mechanism, substantially parallel husking rollers 121 are mounted, as indicated in Figure 6 of the drawings. The specific structure of the husking roller mechanism forms no part of the present invention, it being generally of the type shown in the patent to Hagadone above mentioned. The husking rollers are driven at their upper ends by suitable gearing comprising elements such as those illustrated at 122, 123 and 124. Ears of corn are delivered from the upper end of the snapping roll mechanism to the husking rollers, and the husks are stripped from the ears as the latter pass downwardly over the rollers 121. As the ears pass over the rollers they are pressed into adequate contact with the rollers by compression devices such as those generally illustrated at 125 in Figure 5.

The compression devices include pressure rods 126, a rock shaft 127 having a crank arm 128, and rock arms 129. The rock shaft is carried by supports 130 pivotally attached to the walls 131 and 132. A lever mechanism generally indicated at 133 operates to regulate the pressure applied to the ears of corn while they are proceeding over the husking rolls. In detail the compression devices are similar to those shown in the United States patent to Swanson, 1,553,572 granted Sept 15, 1925.

For the purpose of correctly positioning the husking roll mechanism and the kernel and husk separating mechanisms relative to each other, the lower end of the latter mechanism is substantially straddled by the walls 114 and 115 of the husking roll mechanism. The end wall 118 also abuts against the lower ends of the walls of the kernel and husk separating mechanism to maintain these parts in their proper operative positions. A shield 134 is mounted above the chute 120 of the husking roll mechanism.

*The elevator, or material handling mechanism*

For the purpose of delivering the corn from the husking roll mechanism to a position from which it may be desirably collected, an elevator 135 is provided. The manner in which this elevator is located with reference to the husking roll mechanism is well illustrated in Figures 1, 3 and 6 of the drawings. The elevator is preferably of the endless conveyor type including a chain 136 carrying elevator platforms 137 at spaced intervals thereon. Each platform is provided with anti-friction rollers 138 for facilitating the operation of the elevator. The endless conveyor is mounted within a casing having side walls 139 and 140. As indicated in Figure 6 the side wall 139 is provided with a lateral opening in communication with the chute 120 of the husking roller mechanism. Through this opening the ears of corn are received so that they may be carried upwardly by the conveyor. The wall 139 is also provided with a lateral opening 141 communicating with the outlet of the husk and kernel separating mechanism, as also indicated in Figure 6 of the drawings.

Figure 3:
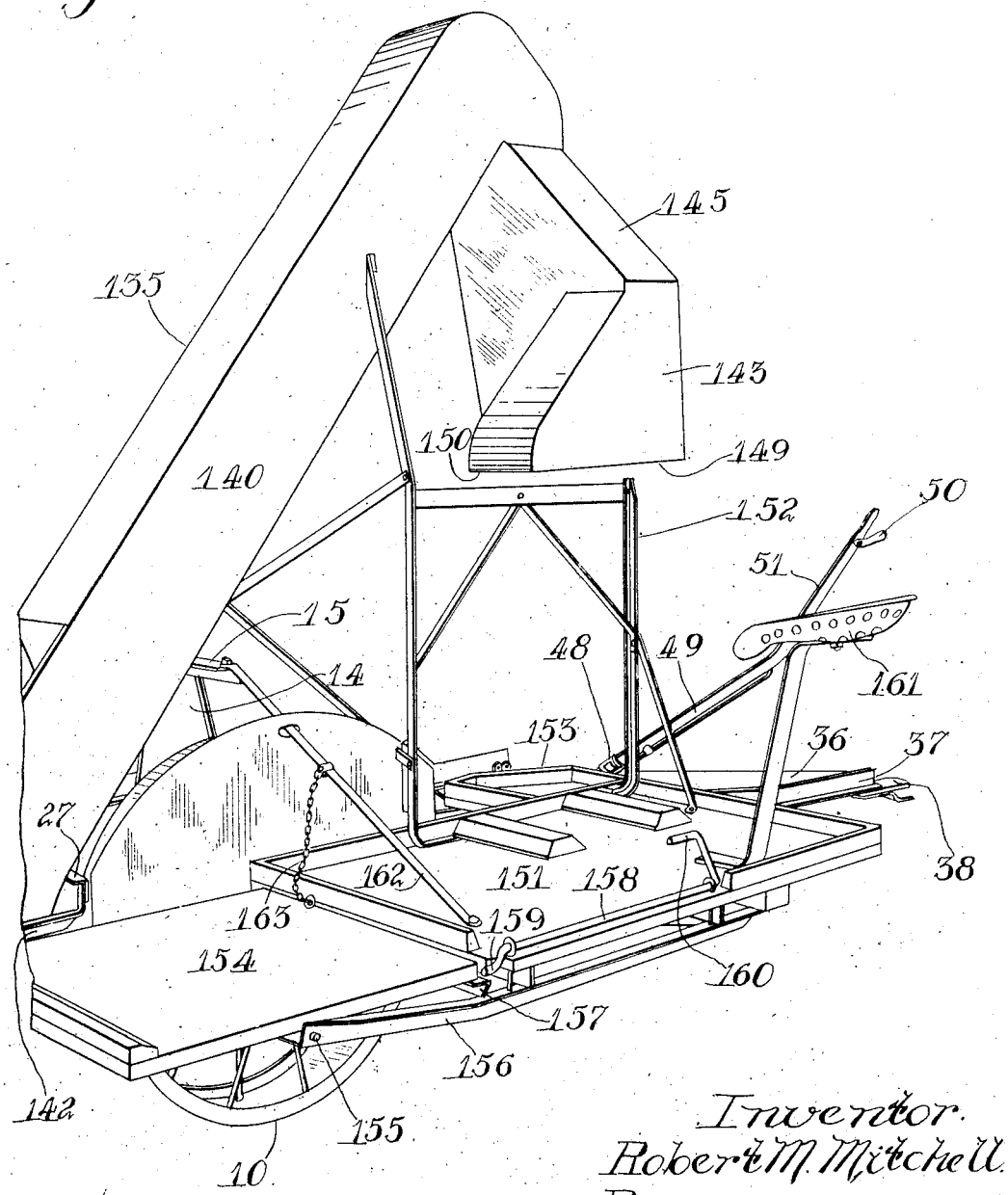
Figure 3 is a perspective view taken from the left hand side of the machine illustrated in Figure 1, this view showing a bagging apparatus, the material handling apparatus for delivering corn to the bagging apparatus, and the bag dumping mechanism.

The lower end of the elevator is positioned between the laterally extended ends of the bars 26 and 27, which are particularly well shown in Figure 4 of the drawings. This construction renders it an easy matter to assemble the elevator and to properly locate it relative to the husking roll mechanism and the separating mechanism. The member 27 is shown in Figure 3 of the drawings as being at one side of the bottom of the elevator, and Figure 6 clearly shows the other end of the member 26 as being located on the opposite side of the bottom of the elevator. Beyond the bottom of the elevator the bars 26 and 27 are secured to a connector 142 which prevents the displacement of the elevator with reference to the husking roll mechanism and the separating mechanism. There is thus provided a structure in the nature of a pocket for the elevator, enabling the machine to withstand the excessive shocks and jars incident to travel over rough land, without displacement of its parts.

From the delivery end of the husking roll mechanism the elevator extends upwardly to a position from which the corn is received by bagging chutes 143 and 144. The chute 143 is offset with relation to the upper end of the endless conveyor, a sloping side wall 145 connecting the conveyor wall 140 with the chute 143. The corn dropping from the end of the endless conveyor strikes a sieve or screen 148, the position of which is indicated by the dotted line connecting the points 146 and 147 in Figure 1 of the drawings. This screen or sieve 148 is preferably located substantially parallel to the wall 145 so as to provide a passageway for the ears of corn. Such kernels as have been removed from the ears fall thru the screen 148 and into the chute 144 from which they pass to a bar.

The chute 143 is widened at its outlet end so as to provide for the positioning of two bags to receive the corn. For instance, while one bag is being filled at the part 149 of the outlet, a filled bag is being positioned near the opposite end 150 of the outlet. Suitable valve mechanism (not shown) may be provided for temporarily shutting off the flow of corn from either part of the outlet.

*The bagging platform*

As clearly indicated in Figure 1 of the the drawings, a bagging platform 151 is located on the side of the main frame opposite from the snapping roll mechanism and is balanced thereagainst. This platform carries a bag supporting device 152 which is provided with any suitable mechanism for holding the tops of the bags in position below the outlet of the chute 143. A platform extension 153 is located directly beneath the outlet of the chute 144. This extension operates to hold the bag for receiving the shelled corn.

Secured preferably at the rear side of the bagging platform is a bag dumping apparatus including a pivoted dumping platform 154. This dumping platform is preferably supported on substantially horizontal pivots 155 carried by bars 156 rigidly secured to the bagging platform. The bag dumping platform is normally in unbalanced condition its forward end being somewhat heavier so that it will return by gravity to the position in which it is shown in Figure 3 of the drawings. A stop 157 extends laterally of the forward end of the dumping platform in such position that it can be engaged by the illustrative latch mechanism. This latch mechanism includes a rock shaft 158 rockably supported on the platform 151. The rearward end of the rock shaft 158 is provided with a crank arm 159 which in the position shown in Figure 3 acts as a dead center stop engaging the stop 157. The rock shaft is provided at its forward end with a trip arm 160 located in convenient proximity to a seat 161. The forward end of the dumping platform is connected to a bagging platform brace 162 by a chain 163.

In operation the filled bags of corn are piled upon the dumping platform 154 in such a manner that the major part of the weight carried by the platform is carried rearwardly of its pivots 155. When a desired number of bags have been piled upon the platform, the operator steps upon the trip 160 and thereby releases the stop 159 from contact with the stop 157. This allows the platform 154 to tilt and deposit a number of bags upon the ground.

The tractor drive connections

One form of the corn picker shown in this application is pulled by a tractor, and the parts of the machine which operate on the corn are driven by the engine of the tractor. The connections by which power is transmitted from the tractor to the corn picker in this form of machine will now be described. These connections are shown in Figures 1, 7, 8, 9, 10 and 11 of the drawings.

Referring to Figure 7 of the drawings, the numeral 164 indicates the driving wheels of a tractor, the drawbar of the tractor being indicated at 165, and the power take-off shaft, at 166. In this form of the machine, the rear end of the power take-off shaft 166 is supported by a transverse bar 167 secured to the tractor.

The draft frame which has previously been described is secured to the drawbar 165 by means of the hitch device 38, and the draft frame carries or supports most of the tractor drive connections. This will be seen from an inspection of Figures 1 and 7 of the drawings.

In connection with the use of the corn picker shown in Figure 7, it is desirable that the picker operate in a path offset from the path of movement of the tractor, and for this purpose the draft frame and the tractor drive connections are angled as illustrated in Figure 7. The main frame of the corn picker carries a main shaft 168 preferably journaled transversely of the machine and supported by the horizontal beam construction 15 connecting the uprights 13 and 14. As shown in Figure 7 of the drawings, the shaft 168 carries a bevel gear 169 at one end, this end of the shaft being journaled in a bracket 170, which also rotatably supports a shaft 171 connected by the power transmission devices described below with the power take-off shaft 166 of the tractor.

The bracket 170 is preferably U-shaped, as shown in Figure 7, so as to afford adequate support for the shaft 171. It provides a forward journal 172 and a rearward journal 173 for that shaft.

The forward end of the shaft 171 is connected by means of a universal joint 173 with one of the parts 174 of a telescopic and extensible shaft construction, the other part of this construction being a square shaft 175 connected by a universal joint 176 with an intermediate shaft 177 indicated by the dotted lines in Figure 8. This shaft 177 is preferably journaled at the top of the upright 54 carried by the draft frame and shown in Figure 1 of the drawings.

The forward end of the shaft 177 is connected by a universal joint to another telescopic shaft connection similar to that comprising the parts 174 and 175. A part of this construction is shown at the left hand end of Figure 8 at 178. The forward end of this telescopic shaft construction is connected by a universal joint to the power take-off shaft 166 of the tractor.

The shield construction for the tractor drive connections

The use of such tractor drive connections as are above described has caused many serious accidents to the operators of the machines by reason of the exposed condition of the shafting and the universal joint construction. These constructions have frequently caught the clothing of an attendant or operator and caused it to be wound about the rotating parts, resulting in serious injury. All likelihood of such injuries is eliminated in the illustrative machine by the protective housings or shield constructions which prevent the rotating parts from coming into contact with the operator or attendant.

The protective housings include a number of pivotally and angularly related parts so designed as to take care of the different angular relationships of the tractor and the picker and to also take care of the different pivotal relationships of the draft frame and the main frame. These parts include a housing fork shown in the drawings to be an integral part of the bracket 170. This fork comprises an upper pivot arm 180 and a lower slide support 181. The arm 180 and the support 181 are preferably branched or separated to such an extent that adequate clearance is provided for the rotation of the universal joint 173.

The forward end of the arm 180 is shaped as illustrated in Figures 10 and 9 of the drawings. It is not only formed with a round nose 182 but its end portion is also shaped somewhat similar to a portion of the surface of a sphere for purposes to later appear. The nose 182 is formed with a square opening 183 for receiving a shouldered portion 184 of the pivot bolt 185.

Secured in operative relation to the nose portion 182 of the pivot arm 180 by means of the bolt 185 and its nut 186 is an enlarged or bell-end 187 of a telescopic shield or housing part 188. The bell-end 187 loosely receives the bolt 185 so that the former may have pivotal movement in a plurality of planes upon the spherically curved pivot arm 180. In order that such movement may take place without unnecessary vibration, wear, and strains, that part of the bell-end 187 which contacts with the pivot arm 180 is formed on spherical curvatures corresponding to the curvatures of the pivot arm.

Desirable up and down pivotal movements of the housing part 188 relative to the bracket 170 are permitted by co-operating slide portions formed upon the lower side of the bell-end 187 and the support 181. As shown in Figure 9 of the drawings, bell-end 187 is formed with two integral extensions or parallel walls 189 and 190. These walls form a guide-way in which the pivot block 191 may have sliding movement. This pivot block 191 is formed with a circular opening 192 for receiving a round stud 193 preferably integrally formed with the support 181.

Slidably received by the housing 188 is a sleeve or second housing part 194 carrying at its forward end a bell-end structure 195. This bell-end structure 195 is similar to the structure of the bell-end 187 previously described. The bell-end 195 co-operates with an intermediate housing 196 having at its rearward end a housing fork carrying a pivot arm 197 and a slide support 198 similar in construction to the pivot arm 180 and the slide support 181.

At the forward end of the intermediate housing 196 arms 199 and 200 are secured for connection with the bell-end 201 of the housing 202 secured to a telescopic part 203. Part 203 telescopes within a sleeve construction 204 supported by a bell-end 205 which is in turn supported by a bracket 206 carried by the tractor.

*The horse drawn machine*

In Figure 12 of the drawings, a modification of the illustrative machine is shown. In this form of the machine the draft frame is replaced by a tongue frame with which is associated a tongue truck and a tongue for adapting the machine for horse operation. The operative mechanisms including the snapping roll mechanism, the husking roll mechanism, and the elevator for delivering material to the bagging apparatus are driven by a unitary power plant rigidly mounted upon the main frame.

As here shown the tongue truck frame comprises a stub tongue 208 supported at its forward end by a tongue truck 209. The tongue truck has a vertical shaft 210 upon which the stub tongue is pivotally mounted. The other end of the stub tongue is pivotally connected to the main frame bar 21 at 211. A frame bar 212 connects the forward end of the stub tongue to the bar 21. There is preferably a pivotal connection for the rear end of the bar 212, connecting it to the main frame.

The bar 212 is rigidly connected to the stub tongue 208 by a cross beam 213 and a rockshaft 214. The rockshaft is rotatably mounted in both the stub tongue and the crank arms are connected by links with the forwardly extending end of the bars 18 and 23 in much the same manner as that indicated in Figure 2 of the drawings. A hand lever mechanism 217 co-operates with a detent bracket 218 for adjusting the relative pivotal positions of the main frame and the tongue frame.

For the purpose of securing draft animals to the illustrative machine a tongue 219 is pivoted to the stub tongue 208 at a position forwardly of the tongue truck. An equalizing bar 220 is pivotally mounted upon the stub tongue 208 rearwardly of the tongue truck. A holder 221 is shown for maintaining the equalizer bar in correct position upon the stub tongue.

Rigidly mounted upon the main frame of the machine and to the rear of the operator's seat 222 is a unitary power plant 223, preferably of the internal combustion engine type, arranged with its crank shaft 224 extending transversely of the machine. This crank shaft is connected with the shaft 168 by means of a power transmitting connection 225. The shaft 168 is the previously described shaft, used for operating all of the parts of the corn picker.

*The driving mechanism*

In Figure 13 of the drawings a diagrammatic illustration of the power transmitting connections for driving all of the operative parts of the corn picker is presented. Most of the parts of these driving connections are used in either of the forms of the machine previously described. When the tractor pulled and tractor operated machine is used the central power shaft 168 is driven by the shaft 171 thru the intermediacy of bevel gears 169 and 226. Under these conditions the sprocket chain 225 and the shaft 224 are not used. These latter devices are used in place of the shaft 171 in the horse drawn machine. In either machine all of the operative parts receive their power from the central power shaft 168.

At the end of the shaft 168 opposite the bevel gear 169 is a bevel pinion 227 from which power is taken to drive the snapping roll mechanism. This pinion drives an extension shaft 228 which is flexibly connected, as illustrated at 229, to one of the snapping rolls. A bevel gear 230 fixed upon the shaft 228 is in mesh with the pinion 227. A hand wheel 231 is fixed on the outer end of the shaft 228.

The stalk gathering chains 70 and 71 are operated by bevel gears 232 meshing respectively with pinions 233 and 234. The pinion 233 is mounted upon a counter-shaft 235 which is driven from the shaft 228 by the sprocket chain 236. The shaft 237 for the pinion 234 receives its power from the countershaft 235 thru a sprocket chain 238.

Power is transmitted from the central power shaft 168 for driving the husking roll mechanism and the husk and kernel separating mechanism by a bevel pinion 239 meshing with a bevel gear 240 secured upon shaft 241. The shaft 241 drives the husking roll shaft 242 thru the intermediacy of sprocket gearing 243.

Gearing for driving the husking rollers 121 from the shaft 242 is illustrated in Figure 14 of the drawings. The husking rollers are connected at their ends by intermeshing spur gears 122 and every alternate one of the husking rollers is provided with a bevel pinion 243 meshing with a bevel gear 244 fixed upon counter-shaft 245. Spur gearing represented by the spur gears 123 and 124 operatively connects the shafts 242 and 245.

For driving the fan 105 and the fan shaft 106, a counter-shaft 246 is provided. This counter-shaft is located between the shaft 242 and the shaft 106 and is connected to those shafts by sprocket chains 247 and 248. The rearward end of the shaft 242 is connected by means of a sprocket chain 249 to a shaft 250 for driving the husk conveyor of the husk and kernel separating mechanism.

An agitator drive shaft 251 extending beyond the confines of the husking roll mechanism illustrated by the dotted rectangle 252 is driven by power derived from the shaft 242. A sprocket chain 253 connects a sprocket wheel 254 on shaft 245 with a similar sprocket wheel on shaft 251.

The elevator illustrated by the dotted line rectangle 255 is operated from a counter-shaft 256 provided with a central sprocket wheel 257 for engaging the conveyor chain. The other end of shaft 256 is connected by means of sprocket chains 258 and 259 to the central power shaft 168, there being a counter-shaft suitably interposed for the purpose of properly correlating the speed of the elevator conveyor to the speed of the central power shaft.

Although the invention has been described with relation to specific structures, it is to be understood that it is not limited thereto, but that it is capable of use in various combinations and sub-combinations such as demanded by the requirements of actual practice.

What is claimed is:

1. A corn picker comprising, in combination, a wheel supported main frame, and a plurality of separately manufactured mechanisms separately assembled around said frame as units, the first unit comprising snapping roll mechanism and an elevator adapted to be mounted on one side of the frame, the second unit being a husking roll mechanism adapted to be carried at the rear of the frame to receive material from the first unit, the third unit comprising a self contained cleaning and separating mechanism for separating corn husks from corn kernels and adapted to be mounted on the frame adjacent the second unit to receive material therefrom, the fourth unit comprising an elevator adapted to be mounted on the frame opposite the first unit and in communication with the third unit, and the fifth unit comprising a bagging apparatus and bag dumping mechanism adapted to be carried on the frame adjacent the fourth unit, all of said units being removable from the frame as separate entities.

2. A corn picker comprising, in combination, a wheel supported main frame, and a plurality of separately manufactured and separately assembled devices mounted on said frame so as to substantially enclose the frame, said devices constituting complete units, the first unit comprising snapping roll mechanism and an elevator adapted to be mounted on one side of the frame, the second unit being a husking roll mechanism adapted to be carried at the rear of the frame to receive material from the first unit, the third unit comprising a self contained cleaning and separating mechanism for separating corn husks from corn kernels and adapted to be mounted on the frame adjacent the second unit to receive material therefrom, the fourth unit comprising an elevator adapted to be mounted on the frame opposite the first unit and in communication with the third unit, the fifth unit comprising a bagging apparatus and bag dumping mechanism adapted to be carried on the frame adjacent the fourth unit, and means included in the main frame for interlocking the second and third units in proper operative relationship, all of said units being removable from the frame as separate entities.

3. A machine of the type described wherein snapping roll mechanism and husking roll mechanism are employed for the picking and husking of ears of corn, the combination therewith, of a wheel supported main frame, a rigid draft frame extending forwardly from the main frame and pivotally related thereto, means carried by the draft frame for changing the relative positions of the main frame and the draft frame, a support carried by the main frame, and extensible power transmitting connections carried by the draft frame and the support for driving the snapping roll mechanism and the husking mechanism from a tractor attached to the forward end of the draft frame.

4. A harvester of the class described, comprising, in combination, a frame, ground wheels for supporting said frame, stalk gathering apparatus and snapping roll mechanism supported by the frame at a position externally thereof and exteriorly of one of said ground wheels, husking mechanism located transversely of the frame and receiving material from said snapping roll mechanism, material handling mechanism located at the side of the frame opposite said snapping roll mechanism and located so as to receive material from said husking mechanism, material collection means supported by the frame at the side opposite said snapping roll mechanism so as to receive material from the material handling mechanism, a draft device attached to the frame and extended forwardly thereof, power transmission apparatus supported by said draft device, and means extending transversely of the frame for balancing the snapping roll mechanism against said material handling mechanism, said draft device and power transmission devices being balanced across the frame against the husking mechanism.

5. A corn picker comprising, in combination, a break-joint frame, snapping roll mechanism and stalk gathering apparatus carried at one side of the frame, material handling apparatus and a material collection apparatus located at the opposite side of said frame, means extending transversely of the frame for balancing said stalk gathering apparatus against said material handling and collection apparatus, and means for adjusting the frame parts for appropriately varying the action of the stalk gathering mechanism without disturbing the balanced condition of the aforesaid devices.

6. In a machine of the class described a main frame, ground wheels for supporting the main frame, stalk gathering mechanism and snapping roll mechanism supported by the frame and mounted as a unit at one side of the frame adjacent one of the ground wheels, husking mechanism carried by the frame at the rear of the ground wheels and so located as to receive material from the snapping roll mechanism, an elevator carried at the side of the frame opposite the snapping roll mechanism and located in a position to receive material from the husking mechanism, bagging chutes below the forward and upward end of the elevator, a bagging platform carried by the frame, means for supporting the bagging platform substantially beneath the outlets of the bagging chutes and at the side of the frame opposite the snapping roll mechanism, and means carried by the frame between the snapping roll mechanism and the elevator for balancing the snapping roll mechanism, the husking mechanism and the elevator.

7. A corn picker of the class described comprising, in combination, a main frame, ground wheels for supporting the main frame, snapping roll mechanism carried by the main frame, husking mechanism carried by the main frame, a bagging platform carried by the frame, and bag dumping apparatus located adjacent the platform, and means accessible from a position on the platform for controlling the bag dumping apparatus.

8. A corn picker of the class described comprising, in combination, a main frame, ground wheels for supporting the main frame, snapping roll mechanism carried by the main frame, husking mechanism carried by the main frame, a bagging platform carried by the frame, devices for separating ears of corn from the kernel of shelled corn, a bagging platform carried by the frame, and bag dumping apparatus located adjacent the platform, and means accessible from a position on the platform for controlling the bag dumping apparatus.

9. A machine of the class described, comprising, in combination, a frame, supporting wheels, stalk gathering apparatus and snapping roll mechanism supported by the frame at one side and externally of one of said supporting wheels, husking roll mechanism at the rear of said frame and positioned transversely thereof, said husking roll mechanism positioned so as to receive material from said snapping roll mechanism, material handling mechanism supported by the frame at the side opposite said snapping roll mechanism and located so as to receive material from the husking mechanism, all of said above mentioned devices comprising a substantially U-shaped arrangement enclosing said frame and said supporting wheel, power transmitting connections supported by the frame within said U-shaped arrangement and operatively connected to all of said devices for driving them, and means extending across the frame for balancing said snapping roll mechanism against the other devices.

10. A frame construction for corn pickers comprising, in combination, supporting wheels, an axle extending between said wheels, an upright carried by the axle adjacent to and inside of each wheel, a beam connecting the upper ends of the uprights and secured thereto, a fore and aft beam connected to one of the uprights and extending considerably rearwardly of and forwardly of one of the wheels, a forward transverse beam, a rear transverse beam, the forward transverse beam being located a substantial distance rearwardly of the end of the fore and aft beam so that the latter overhangs the construction above set forth, a rigid draft frame pivotally related to the forward transverse beam and positioned mainly below the fore and aft beam, a rock shaft mounted on the draft frame, a crank arm on the rock shaft, a link connecting the crank arm with the forward end of the fore and aft beam, and means for adjusting the rock shaft to change the relation of the draft frame relative to the remainder of the frame construction.

11. In a machine of the class described, a wheel supported frame, stalk gatherers and snapping roll mechanism at one side of the frame, husking mechanism at the rear end of the frame for receiving material from the snapping roll mechanism, elevating and separating mechanism at the side of the frame opposite from said snapping roll mechanism and so situated as to receive material from the husking mechanism, material gathering and dumping mechanism at the delivery end of said elevating and separating mechanism and carried by the frame at the side opposite from said snapping roll mechanism, and means extending across the frame for balancing the snapping roll mechanism against the mechanism at the opposite side of the frame.

12. A corn picker of the class described, comprising, in combination, a main frame, ground wheels for supporting the main frame, a rigid draft frame pivotally attached to the main frame and extending forwardly therefrom, snapping roll mechanism and husking mechanism mounted upon the main frame, an upright secured to the main frame, a second upright secured to the draft frame, power transmitting devices supported by said uprights for driving the snapping roll mechanism and the husking mechanism from a position adjacent the forward end of the draft frame, said power transmitting devices including telescoping connections between said uprights, and means for changing the pivotal relationship of said frames.

13. A corn harvester of the class described comprising, in combination, a main frame, ground wheels for supporting the main frame, a beam extending across the main frame in a fore and aft direction, a draft frame at the front of the main frame and secured to the forward end of said beam; husking roll mechanism located at the rear end of the beam so that a part of its weight is borne thereby, a snapping roll mechanism carried at one side of the main frame, a material handling mechanism carried at the opposite side of the main frame, said frame including a beam construction extending transversely thereof from the snapping roll mechanism to the material handling mechanism so as to balance the one against the other, and power transmitting devices carried by the draft frame and the main frame for operating the snapping roll mechanism and the husking roll mechanism.

14. A corn picker of the class described comprising, in combination, a wheel supported main frame, gathering means carried by the frame for removing ears of corns from their stalks, corn husking mechanism devices for separating shelled corn from the ears of corn and separately bagging them, bag dumping mechanism, and power transmitting devices carried by the frame for operating the gathering and husking mechanisms.

15. A corn picker of the class described comprising, in combination, a wheel supported frame, snapping roll mechanism, corn husking mechanism carried by the frame and located to receive ears of corn from the snapping roll mechanism, an elevator for receiving corn from the husking roll mechanism, kernel and ear separating mechanism including chutes receiving material from the delivery end of the elevator, bagging apparatus, a draft frame, and power transmitting devices carried by the draft frame and by the wheel supported frame for operating the snapping roll mechanism and the husking mechanism, the bagging apparatus and the snapping roll mechanism being located on opposite sides of the wheel supported frame so as to substantially balance each other across said frame, and the husking mechanism being located at the rear of the wheel supported frame so as to be substantially balanced against the draft frame and part of the power transmitting connections.

16. A corn picker of the class described comprising, in combination, a wheel supported main frame, a rigid draft frame pivotally secured to the main frame and located forwardly of the main frame, means carried by the draft frame for changing the pivotal relationship of the main frame and the draft frame, an upright secured to the draft frame, a second upright secured to the main frame, and power transmitting devices having telescoping parts extending between and supported by said uprights.

17. A corn harvester comprising, in combination, a wheel supported main frame, a bagging platform secured at one side of said frame, a normally unbalanced bag support secured to the bagging platform, and a trip mechanism for controlling the dumping of bags.

18. A corn picker of the class described comprising, in combination, a wheel supported main frame, a rigid draft frame pivotally related to the main frame and located forwardly of the main frame, means for changing the pivotal relationship of the main frame and the draft frame, an upright secured to the main frame, an upright secured to the draft frame, and power transmitting devices having telescoping parts extending between and supported by said uprights.

19. A corn harvester of the class described comprising, in combination, a main frame, ground wheels for supporting the main frame, a beam extending across the main frame in fore and aft direction, a draft frame at the front of the main frame and movably related to the forward end of said beam, husking roll mechanism located adjacent the rear end of the beam so that at least a part of the weight is borne thereby, a snapping roll mechanism carried at one side of the main frame, a material handling mechanism carried at the opposite side of the main frame, said frame including a beam construction extending transversely thereof from the snapping roll mechanism to the material handling mechanism so as to balance the one against the other, and power transmitting devices carried by the draft frame and the main frame for operating the snapping roll mechanism and the husking roll mechanism.

20. A machine of the class described, comprising, in combination, a frame, supporting wheels, stalk gathering mechanism and snapping roll mechanism supported by the frame at one side thereof externally of the supporting wheels, husking mechanism supported by the frame at the rear thereof so as to receive material from the snapping roll mechanism, material handling and separating mechanism located at the side of the frame opposite the snapping roll mechanism so as to receive material from the husking mechanism, bagging chutes at the delivery end of the material handling mechanism for delivering material to positions externally of the supporting wheel opposite the snapping roll mechanism, and material collection apparatus located adjacent the delivery ends of the chutes.

21. A corn picker of the class described comprising, in combination, a wheel supported main frame including fore and aft beams extending at the rear of the supporting wheels, a draft frame secured to the main frame and located forwardly thereof, and a kernel and husk separating unit mounted upon the rearward portion of the fore and aft beams by uprights contacting with the outer surfaces of the respective beams.

22. A corn picker of the class described comprising, in combination, a wheel supported main frame, a husk and kernel separating mechanism mounted upon the rearward part of the main frame, parallel frame bars extending laterally of the main frame and beyond the discharge end of the separating mechanism, and a material handling elevator seated between the ends of the parallel bars.

23. A husk and kernel separating mechanism comprising, in combination, inclined side walls, a husk receiving platform located between the side walls and substantially parallel to the upper edges thereof, a grating substantially aligned with the husk receiving platform and located at the upper end thereof, an endless conveyer, sprockets mounted between the side walls at the end thereof so as to guide the upper run of the endless conveyer over the husk receiving platform and the grating, a sloping bottom wall, means for guiding the lower run of the conveyer along the sloping bottom wall so as to move kernels of corn toward the outlet of the mechanism, an open end substantially cylindrical blower casing mounted between the side walls and between the upper and lower runs of the conveyer, a rotatable fan within the blower casing, and means for directing a blast of air from the fan upwardly out of the mechanism and thru the grating.

24. A horse drawn corn picker comprising, in combination, a main frame, a draft frame, snapping roll mechanism secured to the main frame, husking roll mechanism located transversely at the rear of the main frame, an elevator at the side of the main frame opposite the snapping roll mechanism, bag handling apparatus adjacent the elevator, a unitary power plant located on the main frame, and power transmitting connections supported by the main frame for operating all of the above mentioned mechanisms.

25. A corn picker comprising, in combination, a wheel supported frame snapping roll mechanism mounted on the frame, husking mechanism mounted on the frame and arranged to receive ears of corn from the snapping roll mechanism, an elevator arranged to receive ears of corn from the husking mechanism, parts of the frame forming an enclosure which surrounds the lower end of the elevator, said parts constituting supports for the elevator and means for preventing the receiving end of the elevator from being moved from proper operating position during the use of the picker, and means carried by the frame for operating the snapping roll mechanism, the husking mechanism and the elevator.

26. A corn picker comprising, in combination, a wheel supported frame, snapping roll mechanism mounted on the frame, husking mechanism mounted on the frame and arranged to receive ears of corn from the snapping roll mechanism, husk and kernal separating mechanism mounted on the frame beneath the husking mechanism, an elevator mechanism receiving ears and kernels of corn from the husking mechanism and the separating mechanism, means for maintaining all of said mechanisms arranged in the designated sequential order around the exterior portions of the frame and means for operating all of said mechanisms, all of said mechanisms being separately removable from the frame as individual units.

27. A corn picker comprising, in combination, a wheel supported frame, spaced supports carried by the frame, said supports presenting opposite faces, husk and kernel separating mechanism carried by the frame, a supporting element extending from the separating mechanism and engaging one of said faces, and a second supporting element extending from the separating mechanism and engaging the other face.

28. A corn picker comprising, in combination, a wheel supported frame, means carried by the frame for snapping ears of corn from corn stalks, husking means receiving ears of corn from the first mentioned means, an elevator at the delivery end of the husking means for conveying ears and kernels of corn, bagging chutes arranged adjacent the delivery end of the elevator so as to receive material therefrom and means within the bagging chutes for separating kernels of corn from ears of corn.

29. A corn picker of the class described comprising, in combination, corn handling mechanism, and bag handling mechanism arranged at the delivery end of the corn handling mechanism, said bag handling mechanism comprising a bag supporting platform, bag supporting uprights carried by the platform, extensions secured to the bag supporting platform, a dumping platform pivotally mounted upon said extension, means for releasably locking the dumping platform in substantially horizontal position, means for tripping said locking means, and lost motion means connecting the bag dumping platform and the first mentioned platform for restraining the second platform from pivotal movements of undue extent.

30. A corn picker comprising, in combination, a wheel supported frame, snapping roll mechanism, husking roll mechanism for receiving ears of corn from the snapping roll mechanism, and husk and kernel separating mechanism mounted upon the frame in interlocked relation with the husking roll mechanism, said separating mechanism comprising side walls, a husk and kernel receiving platform, a screen forming a substantial continuation of the husk and kernel receiving platform, an endless conveyer mounted between the side walls so as to have its upper run passing upwardly over the platform and the screen, a bottom wall for guiding parts of the endless conveyer toward the delivery end of the separating mechanism, a cylindrical housing secured to the side walls of the separating mechanism and extending between the upper and lower runs of the conveyer, bearing supports secured to the side walls, a shaft rotatably mounted in said supports, a blower mounted on the shaft, and a rotary fan carried by and operated by the shaft, said casing being provided with a substantially tangential outlet directing blasts of air upwardly thru the screen, said side walls being provided with openings traversed by said supports.

31. A corn picker comprising, in combination, a main frame, a draft frame pivotally attached to the main frame, snapping roll mechanism, and corn husking mechanism, the main frame having a central transverse bridge-like construction across one end of which the snapping roll mechanism and the husking mechanism are partially suspended so as to balance each other.

32. A corn picker comprising, in combination, a main frame, supporting wheels for the main frame, an upright transverse bridge-like construction mounted on the main frame, snapping roll mechanism and corn husking mechanism supported by one end of the bridge-like construction, tractor drive connections supported by the other end of the bridge-like construction, said tractor drive connections including angularly related drive shafts and telescopically related nonrotatable shield constructions for the drive shafts.

33. A corn picker comprising, in combination, a wheel supported main frame, a draft frame pivotally attached to the main frame forwardly thereof, snapping roll mechanism carried at one side of the main frame, husking mechanism carried transversely of the main frame at the rear thereof and mounted to receive ears of corn from the snapping roll mechanism, husk and kernel separating mechanism carried by the main frame at the rear thereof and interlocked with the husking mechanism, an elevator pocketed in the main frame and supported at the side of the main frame opposite from the snapping roll mechanism, a bagging platform carried by the main frame at the side opposite from the snapping roll mechanism and located beneath the delivery end of the elevator, bag dumping mechanism attached to the bagging platform, mechanism for driving all of the above mentioned mechanism, a single drive shaft located transversely of the main frame for transmitting power to all of the above mentioned mechanisms, tractor drive connections operatively connected with the drive shaft and supported by the main frame at the side opposite from the snapping roll mechanism and nonrotatable shield constructions surrounding the tractor drive connections and carried by the main frame and the draft frame at the side opposite from the snapping roll mechanism.

34. A corn picker comprising, in combination, a main frame, ground wheels for supporting the main frame, an axle located transversely centrally of the main frame and connecting the ground wheels, a draft frame pivotally connected to the main frame and extending forwardly thereof, a truck for supporting the forward end of the draft frame, snapping roll mechanism carried by the main frame at one side thereof, husking roll mechanism carried by the main frame at the rear and transversely thereof, husk and kernel separating mechanism carried transversely of the rear of the main frame and interlocked with the husking mechanism, supporting means connecting the snapping roll mechanism and the husking mechanism so as to balance them across the part of the main frame near one of the ground wheels, an elevator carried by the main frame and supported at the side thereof opposite the snapping roll mechanism so as to receive ears and kernels of corn from the husking mechanism, bagging apparatus carried by the main frame and located exteriorly of the ground wheel opposite from the snapping roll mechanism, a unitary power plant carried by the forward portion of the main frame, power transmitting devices carried by the main frame centrally thereof so as to be substantially enclosed by the power plant and all of the above mentioned mechanisms, and driving connections between the unitary power plant and power transmitting connections.

35. The combination expressed in claim 34 characterized by the power transmitting connections including a central power shaft rotatably supported by the main frame and extending transversely thereof, gearing connecting the central power shaft with the snapping roll mechanism, power transmitting devices connecting the central power shaft with the husking roll mechanism, means for driving the husk and kernel separating mechanism from power derived from the central power shaft and speed reduction mechanism for transmitting power from the central power shaft to the elevator.

36. A corn picker comprising, in combination, a main frame, snapping roll mechanism, corn husking mechanism, an elevator, bagging apparatus, means for connecting all of said mechanisms with the main frame so that they surround the central portion of the main frame, and driving connections for operating all of said mechanisms, said driving connections substantially centralized by the midportion of the main frame and including a central power shaft located transversely of the main frame, bevel gearing connecting the snapping roll mechanism and the central power shaft, gearing connecting the central power shaft and the husking mechanism, and power transmitting connections connecting the central power shaft and the elevator.

37. A corn picker comprising, in combination, a wheel supported main frame of rectangular formation, parallel longitudinally extending frame bars projecting a substantial distance forward of the front transverse bar of the main frame, a draft frame having its rearward end extending under the forward ends of said parallel bars, pivotal connections between the rear end of the draft frame and the front transverse bar of the main frame, a connection between the forward end of the parallel bars and the draft frame for varying the angular relations of the frames, said connections including a rock shaft having crank arms extending therefrom, and links connected to the crank arms.

38. A corn picker of the class described comprising, in combination, ground wheels, a main frame carried by the ground wheels, snapping roll mechanism carried by the main frame at one side thereof, corn husking mechanism mounted transversely on the rearward portion of the main frame, a transverse bridge-like construction mounted upon the main frame between the ground wheels in substantially parallel relation to the husking mechanism and adjacent thereto, supporting connections between the bridge-like construction and the husking mechanism, and a central power shaft carried by the bridge-like construction for transmitting power to the snapping roll mechanism and the husking mechanism.

In testimony whereof I affix my signature.
ROBERT M. MITCHELL.